United States Patent
Gu et al.

(10) Patent No.: US 12,015,950 B2
(45) Date of Patent: Jun. 18, 2024

(54) BIDIRECTIONAL FORWARDING DETECTION (BFD) PARAMETER NEGOTIATION METHOD, APPARATUS AND CHIP

(71) Applicant: Suzhou Centec Communications Co., Ltd., Jiangsu (CN)

(72) Inventors: Wei Gu, Jiangsu (CN); Zhichuan He, Jiangsu (CN); Lei Li, Jiangsu (CN); Haiqing Xu, Jiangsu (CN); Jie Zhou, Jiangsu (CN)

(73) Assignee: Suzhou Centec Communications Co., Ltd., Jiangsu (CN)

( * ) Notice: Subject to any disclaimer, the term of this patent is extended or adjusted under 35 U.S.C. 154(b) by 482 days.

(21) Appl. No.: 17/311,372

(22) PCT Filed: Jun. 17, 2019

(86) PCT No.: PCT/CN2019/091539
§ 371 (c)(1),
(2) Date: Jun. 7, 2021

(87) PCT Pub. No.: WO2020/113936
PCT Pub. Date: Jun. 11, 2020

(65) Prior Publication Data
US 2022/0116827 A1    Apr. 14, 2022

(30) Foreign Application Priority Data
Dec. 7, 2018 (CN) .......................... 201811498100.6

(51) Int. Cl.
*H04W 28/24* (2009.01)
*H04W 28/02* (2009.01)
*H04W 28/06* (2009.01)

(52) U.S. Cl.
CPC ....... *H04W 28/24* (2013.01); *H04W 28/0268* (2013.01); *H04W 28/06* (2013.01)

(58) Field of Classification Search
CPC .. H04W 28/24; H04W 28/0268; H04W 28/06
(Continued)

(56) References Cited

U.S. PATENT DOCUMENTS 7,561,527 B1 * 7/2009 Katz ....................... H04L 45/22
370/242
7,860,981 B1    12/2010 Vinokour et al.
(Continued)

FOREIGN PATENT DOCUMENTS

CN        105847056 A    8/2016
CN        107547619 A    1/2018
(Continued)

*Primary Examiner* — Faisal Choudhury
(74) *Attorney, Agent, or Firm* — Samson G. Yu (57) ABSTRACT

Provided is a Bidirectional Forwarding Detection (BFD) parameter negotiation method, apparatus and chip. The method includes that: a first apparatus sends a BFD negotiation packet to a second apparatus, the BFD negotiation packet carrying a first verification value; the first apparatus receives a BFD negotiation response packet returned by the second apparatus, the BFD negotiation response packet carrying a second verification value; the first apparatus checks whether the first verification value and the second verification value match each other, and determines whether negotiation of BFD parameters is an erroneous negotiation according to a checking result.

19 Claims, 5 Drawing Sheets

(58) Field of Classification Search
USPC ........................................................ 370/329
See application file for complete search history.

(56) References Cited

U.S. PATENT DOCUMENTS

2008/0172582 A1    7/2008  Sinicrope et al.
2014/0307564 A1*  10/2014  Li ...................... H04L 43/0823
                                                            370/242

FOREIGN PATENT DOCUMENTS

| CN | 107979501 A | 5/2018 | | |
|---|---|---|---|---|
| CN | 109743746 A | 5/2019 | | |
| KR | 20160131532 A | 11/2016 | | |
| WO | 2014075213 A1 | 5/2014 | | |
| WO | WO-2015102760 A1 * | 7/2015 | ............. | H04L 45/28 |

\* cited by examiner

BIDIRECTIONAL FORWARDING DETECTION (BFD) PARAMETER NEGOTIATION METHOD, APPARATUS AND CHIP

CROSS REFERENCE

This application is a National Stage Filing of the PCT International Application No. PCT/CN2019/091539 filed on Jun. 17, 2019, which claims priority to Chinese Application No. 201811498100.6 filed on Dec. 7, 2018, the entirety of which is herein incorporated by reference.

TECHNICAL FIELD

Embodiments of the present disclosure relate to the field of communications, and in particular to a Bidirectional Forwarding Detection (BFD) parameter negotiation method, apparatus and chip.

BACKGROUND

BFD is a simple Hello protocol that, in many respects, is similar to neighbor detection components of well-known routing protocols. A pair of systems transmit detection packets periodically over each path of sessions established between the two systems. If a system stops receiving the detection packets from the neighboring system for long enough, some component in the bidirectional path between the current system and the neighboring system is assumed to have failed. Under some conditions, systems may negotiate sending and receiving rates between the systems to reduce overhead.

According to the BFD protocol, negotiation is initiated by sending a P packet (that is, a BFD control packet with a Poll (P) bit set to 1), and after successful negotiation, the apparatus of the neighboring system replies with an F packet (that is, a BFD control packet with a Final (F) bit set to 1). After receiving the F packet, the initiator of negotiation considers the negotiation to be successful, and starts to perform detection at the sending and receiving rate as negotiated.

Figure 1:
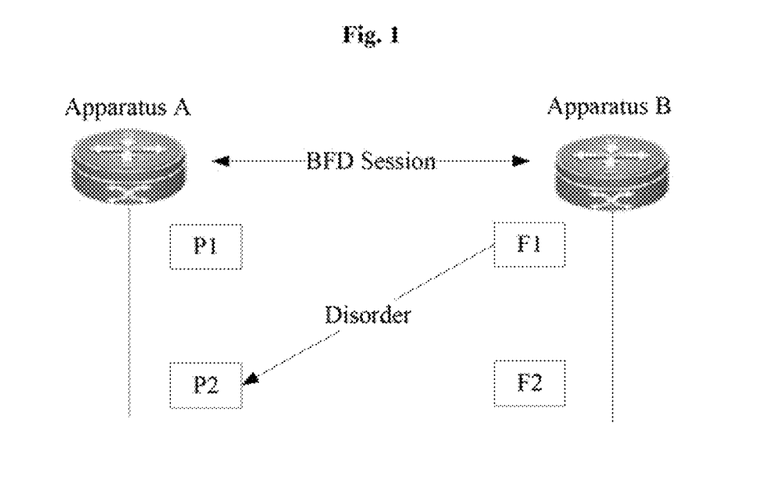
FIG. 1 is a schematic diagram of BFD negotiation in the related art.
Figure 2:
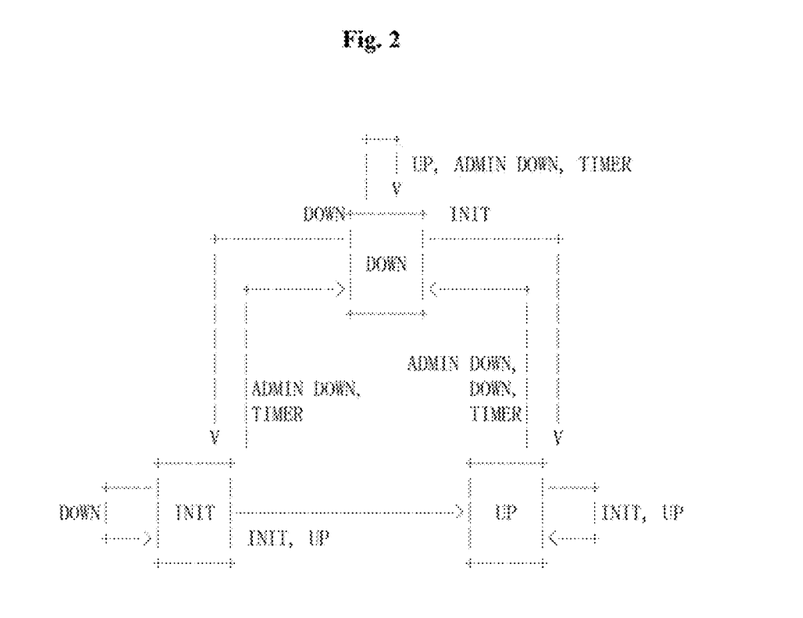
FIG. 2 is a schematic diagram of a BFD state machine in the related art.

FIG. 1 is a schematic diagram of BFD negotiation in the related art. As shown in FIG. 1, when parameter negotiation is frequent between BFD sessions, a BFD P/F packet disorder may occur, which causes an erroneous negotiation, thereby leading to a Down state of a BFD state machine. FIG. 2 is a schematic diagram of a BFD state machine in the related art. As show in FIG. 2, the BFD state will change from an UP state to a Down state. The technology in the related art cannot solve the problem of P/F packet disorder, and the BFD related protocols and standards also do not put forward effective solutions, only propose that negotiation of BFD parameters cannot be too frequent.

For the problem in the related art that disorder of BFD negotiation packets causes an erroneous negotiation, thereby leading to the Down state on the BFD state machine, no solution has been proposed yet.

SUMMARY

The embodiments of the present disclosure provide a BFD parameter negotiation method, apparatus and chip to at least solve the problem in the related art that disorder of BFD negotiation packets causes an erroneous negotiation, thereby leading to a Down state of a BFD state machine.

According to an embodiment of the present disclosure, a BFD parameter negotiation method is provided, which may include the following operations.

A first apparatus sends a BFD negotiation packet to a second apparatus. The BFD negotiation packet carries a first verification value, and the BFD negotiation packet is a BFD control packet with a P bit set to 1.

The first apparatus receives a BFD negotiation response packet returned by the second apparatus. The BFD negotiation response packet carries a second verification value, and the BFD negotiation response packet is a BFD control packet with an F bit set to 1.

The first apparatus checks whether the first verification value and the second verification value match each other, and determines whether negotiation of BFD parameters is an erroneous negotiation according to a checking result.

In some exemplary embodiments, the operation that the first apparatus checks whether the first verification value and the second verification value match each other, and determines whether the negotiation of the BFD parameters is an erroneous negotiation according to the checking result may include the following operations.

The first apparatus compares the second verification value with the first verification value.

In a case where the comparison result is that the first verification value and the second verification value are equal, the first apparatus determines that the checking result is that the first verification value and the second verification value match each other, and determines that the negotiation of the BFD parameters is not an erroneous negotiation according to the checking result.

In a case where the comparison result is that the first verification value and the second verification value are not equal, the first apparatus determines that the checking result is that the first verification value and the second verification value do not match each other, and determines that the negotiation of the BFD parameters is an erroneous negotiation according to the checking result.

In some exemplary embodiments, before the first apparatus sends the BFD negotiation packet to the second apparatus, the method may further include the following operations.

The first apparatus generates the first verification value according to negotiation content of the BFD parameters.

The first apparatus saves the first verification value.

The first apparatus writes the first verification value in a Required Min Echo Rx Interval field of the BFD control packet.

In some exemplary embodiments, the first apparatus generates the first verification value according to at least one of the following negotiation content of the BFD parameters: Detect Mult, Desired Min Tx Interval, and Required Min Rx Interval.

In some exemplary embodiments, the first verification value occupies 1 byte, 2 bytes, 3 bytes, or 4 bytes.

According to another embodiment of the present disclosure, a BFD parameter negotiation method is also provided, which may include the following operations.

A second apparatus receives a BFD negotiation packet sent by a first apparatus. The BFD negotiation packet carries a first verification value, and the BFD negotiation packet is a BFD control packet with a P bit set to 1.

The second apparatus completes negotiation of BFD parameters according to the BFD negotiation packet.

The second apparatus returns a BFD negotiation response packet to the first apparatus. The BFD negotiation response packet carries a second verification value, the BFD negotiation response packet is a BFD control packet with an F bit set to 1, and the BFD negotiation response packet is used for instructing the first apparatus to check whether the first verification value and the second verification value match each other and determine whether the negotiation of the BFD parameters is an erroneous negotiation according to a checking result.

In some exemplary embodiments, before the second apparatus returns the BFD negotiation response packet to the first apparatus, the method may further include the following operation.

The second apparatus carries the second verification value in the BFD negotiation response packet by writing the first verification value in the Required Min Echo Rx Interval field of the BFD control packet.

In some exemplary embodiments, the second verification value occupies 1 byte, 2 bytes, 3 bytes, or 4 bytes.

According to another embodiment of the present disclosure, a BFD parameter negotiation apparatus is also provided, which is applied to the first apparatus, and may include a sending module, a first receiving module, and a determining module.

The sending module is configured to send a BFD negotiation packet to a second apparatus. The BFD negotiation packet carries a first verification value, and the BFD negotiation packet is a BFD control packet with a P bit set to 1.

The first receiving module is configured to receive a BFD negotiation response packet returned by the second apparatus. The BFD negotiation response packet carries a second verification value, and the BFD negotiation response packet is a BFD control packet with an F bit set to 1.

The determining module is configured to check whether the first verification value and the second verification value match each other, and determine whether negotiation of BFD parameters is an erroneous negotiation according to a checking result.

In some exemplary embodiments, the determining module may include: a comparing unit, a first determining unit, and a second determining unit.

The comparing unit is configured to compare the second verification value with the first verification value.

The first determining unit is configured to determine, in a case where the comparison result is that the first verification value and the second verification value are equal, that the checking result is that the first verification value and the second verification value match each other, and determine that the negotiation of the BFD parameters is not an erroneous negotiation according to the checking result.

The second determining unit is configured to determine, in a case where the comparison result is that the first verification value and the second verification value are not equal, that the checking result is that the first verification value and the second verification value do not match each other, and determine that the negotiation of the BFD parameters is an erroneous negotiation according to the checking result.

In some exemplary embodiments, the apparatus may further include: a generating module, a saving module, and a writing module.

The generating module is configured to generate the first verification value according to the negotiation content of the BFD parameters.

The saving module is configured to save the first verification value.

The writing module is configured to write the first verification value in a Required Min Echo Rx Interval field of the BFD control packet.

In some exemplary embodiments, the generating module is further configured to:
generate the first verification value according to at least one of the following negotiation content of the BFD parameters: the Detect Mult, the Desired Min Tx Interval, and the Required Min Rx Interval.

In some exemplary embodiments, the first verification value occupies 1 byte, 2 bytes, 3 bytes, or 4 bytes.

According to another embodiment of the present disclosure, a BFD parameter negotiation apparatus is also provided, which is applied to the second apparatus, and may include a second receiving module, a negotiating module, and a returning module.

The second receiving module is configured to receive a BFD negotiation packet sent by a first apparatus. The BFD negotiation packet carries a first verification value, and the BFD negotiation packet is a BFD control packet with a P bit set to 1.

The negotiating module is configured to complete negotiation of BFD parameters according to the BFD negotiation packet.

The returning module is configured to return a BFD negotiation response packet to the first apparatus. The BFD negotiation response packet carries a second verification value, the BFD negotiation response packet is a BFD control packet with an F bit set to 1, and the BFD negotiation response packet is used for instructing the first apparatus to check whether the first verification value and the second verification value match each other and determine whether the negotiation of the BFD parameters is an erroneous negotiation according to a checking result.

In some exemplary embodiments, the apparatus may further include: a carrying module.

The carrying module is configured to carry the second verification value in the BFD negotiation response packet by writing the first verification value in a Required Min Echo Rx Interval field of the BFD control packet into the BFD negotiation response packet.

In some exemplary embodiments, the second verification value occupies 1 byte, 2 bytes, 3 bytes, or 4 bytes.

According to yet another embodiment of the present disclosure, a BFD parameter negotiation chip is also provided, which may include a processor.

The processor is configured to:
send a BFD negotiation packet to a second apparatus, the BFD negotiation packet carrying a first verification value, and the BFD negotiation packet being a BFD control packet with a P bit set to 1;
receive a BFD negotiation response packet returned by the second apparatus, the BFD negotiation response packet carrying a second verification value, and the BFD negotiation response packet being a BFD control packet with an F bit set to 1; and
check whether the first verification value and the second verification value match each other, and determine whether negotiation of BFD parameters is an erroneous negotiation according to a checking result.

According to yet another embodiment of the present disclosure, a BFD parameter negotiation chip is also provided, which may include a processor.

The processor is configured to:
receive a BFD negotiation packet sent by a first apparatus, the BFD negotiation packet carrying a first verification value, and the BFD negotiation packet being a BFD control packet with a P bit set to 1;
complete negotiation of BFD parameters according to the BFD negotiation packet; and return a BFD negotiation response packet to the first apparatus, the BFD negotiation response packet carrying a second verification value, the BFD negotiation response packet being a BFD control packet with an F bit set to 1, and the BFD negotiation response packet being used for instructing the first apparatus to check whether the first verification value and the second verification value match each other and determine whether the negotiation of the BFD parameters is an erroneous negotiation according to a checking result.

According to yet another embodiment of the present disclosure, a storage medium is also provided. The storage medium stores a computer program. The computer program is configured to execute, at runtime, operations in any of the above method embodiments.

According to yet another embodiment of the present disclosure, an electronic apparatus is also provided, which includes a memory and a processor. The memory stores a computer program. The processor is configured to run the computer program to execute operations in any of the above method embodiments.

Through the embodiments of the present disclosure, the first apparatus sends the BFD negotiation packet to the second apparatus, the BFD negotiation packet carrying the first verification value; the first apparatus receives the BFD negotiation response packet returned by the second apparatus, the BFD negotiation response packet carrying a second verification value; the first apparatus checks whether the first verification value and the second verification value match each other, and determines whether the negotiation of the BFD parameters is an erroneous negotiation according to the checking result. Therefore, the problem in the related art that disorder of BFD negotiation packets causes an erroneous negotiation, thereby leading to a Down state of a BFD state machine can be solved, and the Down state on the BFD state machine is avoided by determining whether the negotiation is an erroneous negotiation by means of checking whether the verification values in the negotiation packet and the response packet match each other.

BRIEF DESCRIPTION OF THE DRAWINGS

The accompanying drawings described here are used for providing further understanding of the embodiments of the present disclosure, and constitute a part of the present disclosure. Schematic embodiments of the present disclosure and description thereof are used for illustrating the embodiments of the present disclosure and not intended to form an improper limit to the embodiments of the present disclosure. In the accompanying drawings.

DETAILED DESCRIPTION OF THE EMBODIMENTS

The present disclosure is elaborated below with reference to the accompanying drawings and embodiments. It is to be noted that the embodiments in the present disclosure and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Figure 3:
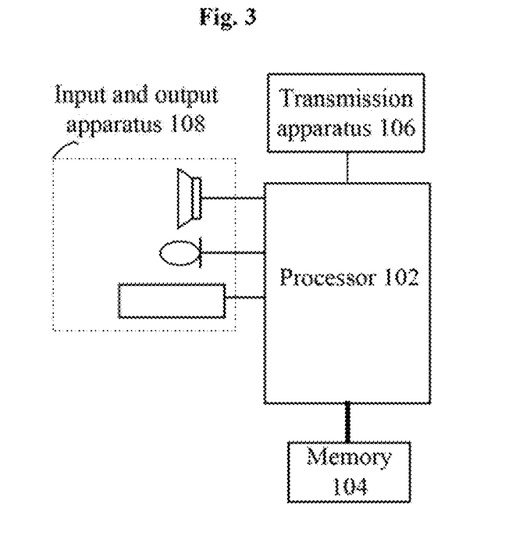
FIG. 3 is a structural block diagram of hardware of a mobile terminal for a BFD parameter negotiation method according to an embodiment of the present disclosure.

The method embodiment provided by the first embodiment may be performed in a mobile terminal, a computer terminal or similar operating apparatuses. Taking that the method is performed on a mobile terminal as an example, FIG. 3 is a structural block diagram of hardware of a mobile terminal for a BFD parameter negotiation method according to an embodiment of the present disclosure. As shown in FIG. 3, the mobile terminal 10 may include one or more (only one is shown in FIG. 3) processors 102 (the processor 102 may include, but not limited to, a Micro Processor Unit (MCU) or a Field Programmable Gate Array (FPGA), and other processing apparatuses), a memory 104 for storing data. In some exemplary embodiments, the mobile terminal may also include a transmission apparatus 106 for a communication function and an input and output apparatus 108. Those of ordinary skill in the art should know that the structure shown in FIG. 3 is only schematic and not intended to limit the structure of the mobile terminal. For example, the mobile terminal 10 may also include more or less components than that in FIG. 3, or has a configuration different from that in FIG. 3.

The memory 104 may be configured to store a computer program, for example, a software program and module of application software, for example, a computer program corresponding to the BFD parameter negotiation method in the embodiments of the present disclosure. The processor 102 runs the computer program stored in the memory 104, thereby executing various functional applications and data processing, namely implementing the above method. The memory 104 may include a high-speed random access memory and may also include a nonvolatile memory, for example, one or more magnetic storage apparatuses, flash memories or other nonvolatile solid-state memories. In some examples, the memories 104 may further include memories remotely set relative to the processor 102, and these remote memories may be connected to the mobile terminal 10 through the network. An example of the network includes, but not limited to, the Internet, an Intranet, a local area network, a mobile communication network and a combination thereof.

The transmission apparatus 106 is configured to receive or send data through a network. A specific example of the network may include a wireless network provided by a communication provider of the mobile terminal 10. In an example, the transmission apparatus 106 includes a Network Interface Controller (NIC), which may be connected with other network apparatuses through a base station, thereby communicating with the Internet. In an example, the transmission apparatus 106 may be a Radio Frequency (RF) module, which is configured to communicate with the Internet in a wireless manner.

Figure 4:
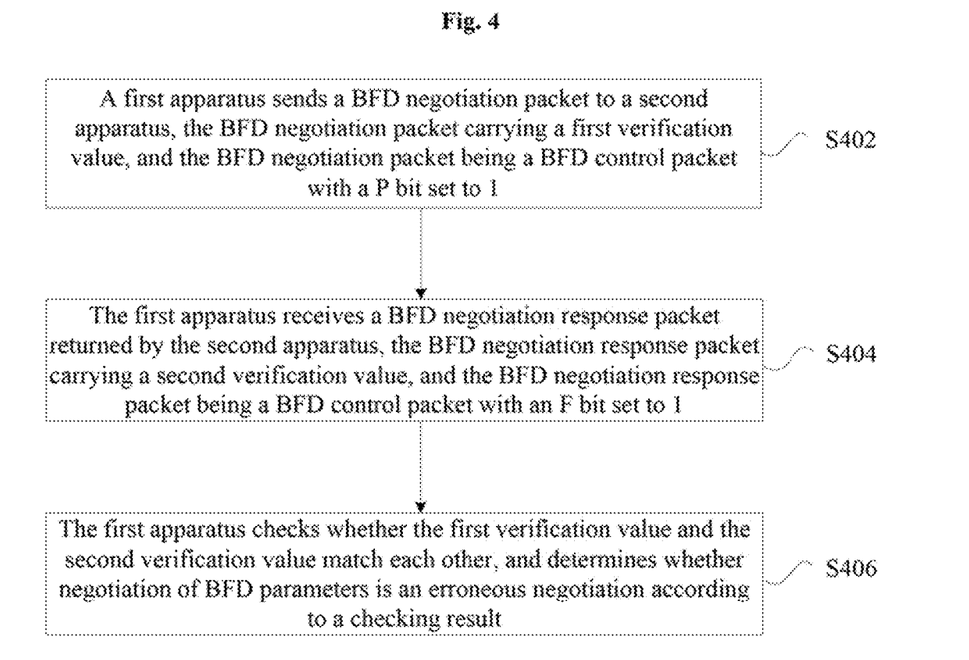
FIG. 4 is a first flowchart of a BFD parameter negotiation method according to an embodiment of the present disclosure.

Based on the above mobile terminal, the embodiment provides a BFD parameter negotiation method. FIG. 4 is a first flowchart of a BFD parameter negotiation method according to an embodiment of the present disclosure. As shown in FIG. 4, the flow includes the following operations.

At S402, a first apparatus sends a BFD negotiation packet to a second apparatus. The BFD negotiation packet carries a first verification value.

At S404, the first apparatus receives a BFD negotiation response packet returned by the second apparatus. The BFD negotiation response packet carries a second verification value.

At S406, the first apparatus checks whether the first verification value and the second verification value match each other, and determines whether negotiation of BFD parameters is an erroneous negotiation according to a checking result.

In the embodiments of the present disclosure, the BFD negotiation packet is a BFD control packet with a P bit set to 1, referred to as P packet, and the BFD negotiation response packet is a BFD control packet with an F bit set to 1, referred to as F packet.

In the process of checking whether the first verification value and the second verification value match each other, the second verification value does not have to be the same as the first verification value, and the checking result will be positive as long as the first verification value and the second verification value match each other. For example, it is also possible to specify that the second verification value is formed by adding one or more pieces of content on the basis of the first verification value.

Through the above operations, the first apparatus sends the BFD negotiation packet to the second apparatus, the BFD negotiation packet carrying the first verification value; the first apparatus receives the BFD negotiation response packet returned by the second apparatus, the BFD negotiation response packet carrying a second verification value; the first apparatus checks whether the first verification value and the second verification value match each other, and determines whether the negotiation of the BFD parameters is an erroneous negotiation according to the checking result. Therefore, the problem in the related art that disorder of BFD negotiation packets causes an erroneous negotiation, thereby leading to a Down state of a BFD state machine can be solved, and the Down state on the BFD state machine is avoided by determining whether the negotiation is an erroneous negotiation by means of checking whether the verification values in the negotiation packet and the response packet match each other.

Figure 5:
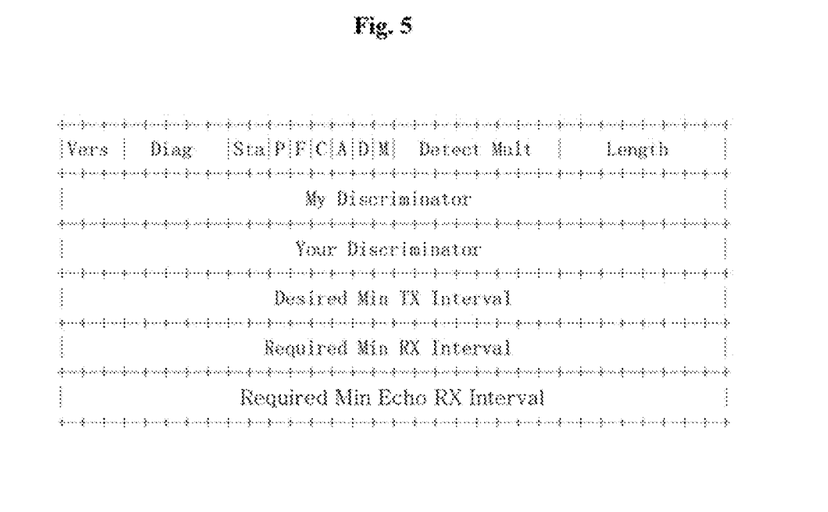
FIG. 5 is a schematic diagram of a BFD packet format according to an embodiment of the present disclosure.

FIG. 5 is a schematic diagram of a BFD packet format according to an embodiment of the present disclosure. As shown in FIG. 5, for a BFD asynchronous mode, the first verification value may be carried in a way of multiplexing the Require Min Echo Rx Interval. Specifically, before the first apparatus sends the BFD negotiation packet to the second apparatus, the first verification value is generated according to negotiation content of the BFD parameters, the first verification value is saved, and the first verification value is written in a Required Min Echo Rx Interval field of the BFD control packet. The Required Min Echo Rx Interval field occupies 4 bytes. In the embodiments of the present disclosure, the first verification value and the second verification value may occupy 1 byte, 2 bytes, 3 bytes or 4 bytes.

The operation that the first apparatus checks whether the first verification value and the second verification value match each other, and determines whether the negotiation of the BFD parameters is an erroneous negotiation according to the checking result may be implemented in the following manner. The first apparatus compares the second verification value with the first verification value. In a case where the comparison result is that the first verification value and the second verification value are equal, the first apparatus determines that the checking result is that the first verification value and the second verification value match each other, and determines that the negotiation of the BFD parameters is not an erroneous negotiation according to the checking result. In a case where the comparison result is that the first verification value and the second verification value are not equal, the first apparatus determines that the checking result is that the first verification value and the second verification value do not match each other, and determines that the negotiation of the BFD parameters is an erroneous negotiation according to the checking result.

As shown in FIG. 5, the BFD initiates the negotiation by sending the BFD negotiation packet. The negotiation content mainly includes Detect Mult, Desired Min Tx Interval, and Required Min Rx Interval. Specifically, the first verification value is generated according to at least one of the Detect Mult, the Desired Min Tx Interval or the Required Min Rx Interval. The first verification value and the second verification value may be either a numeric value or an identifier, as long as the first verification value and the second verification value correspond to the negotiation content.

Figure 6:
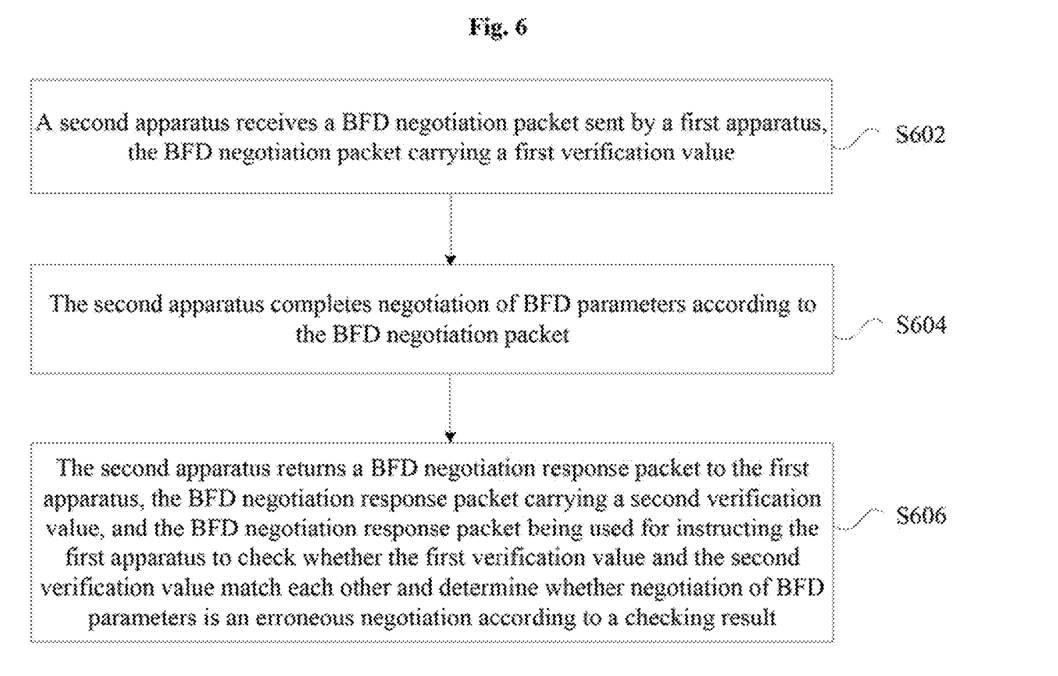
FIG. 6 is a second flowchart of a BFD parameter negotiation method according to an embodiment of the present disclosure.

The embodiments of the present disclosure also provide a BFD parameter negotiation method. FIG. 6 is a second flowchart of a BFD parameter negotiation method according to an embodiment of the present disclosure. As shown in FIG. 6, the flow includes the following operations.

At S602, a second apparatus receives a BFD negotiation packet sent by a first apparatus. The BFD negotiation packet carries a first verification value.

At S604, the second apparatus completes negotiation of BFD parameters according to the BFD negotiation packet.

At S606, the second apparatus returns a BFD negotiation response packet to the first apparatus. The BFD negotiation response packet carries a second verification value, and the BFD negotiation response packet is used for instructing the first apparatus to check whether the first verification value and the second verification value match each other and determine whether the negotiation of the BFD parameters is an erroneous negotiation according to a checking result.

The operation that the first apparatus checks whether the first verification value and the second verification value match each other, and determines whether the negotiation of the BFD parameters is an erroneous negotiation according to the checking result may be implemented in the following manner. The first apparatus compares the second verification value with the first verification value. In a case where the comparison result is that the first verification value and the second verification value are equal, the first apparatus determines that the checking result is that the first verification value and the second verification value match each other, and determines that the negotiation of the BFD parameters is not an erroneous negotiation according to the checking result. In a case where the comparison result is that the first verification value and the second verification value are not equal, the first apparatus determines that the checking result is that the first verification value and the second verification value do not match each other, and determines that the negotiation of the BFD parameters is an erroneous negotiation according to the checking result.

Through the above operations, the problem in the related art that the BFD negotiation packet disorder causes an erroneous negotiation, thereby leading to the Down state on the BFD state machine is solved, and the Down state on the BFD state machine is avoided by determining whether the negotiation is an erroneous negotiation by means of checking whether the verification values in the negotiation packet and the response packet match each other.

In some exemplary embodiments, before the second apparatus returns the BFD negotiation response packet to the first apparatus, the second apparatus carries the second verification value in the BFD negotiation response packet by writing the first verification value in the Required Min Echo Rx Interval field of the BFD control packet. The first verification value and the second verification value may be either a numeric value or an identifier, as long as the first verification value and the second verification value correspond to the negotiation content.

As shown in FIG. 5, for a BFD asynchronous mode, the second verification value may be carried in a way of multiplexing the Require Min Echo RX Interval. The second verification value is written in the Require Min Echo Rx Interval field of the BFD negotiation packet. The Require Min Echo Rx Interval field occupies 4 bytes. In the embodiments of the present disclosure, the first verification value and the second verification value may occupy 1 byte, 2 bytes, 3 bytes or 4 bytes.

The BFD parameter negotiation method in the embodiments of the present disclosure may be implemented by software or chip. The BFD parameter negotiation method is described in detail below.

As shown in FIG. 1, in the process of negotiation of BFD parameters, the P1 packet should be paired with the F1 packet, and the P2 packet should be successfully paired with the F2 packet. However, due to network packet loss or network congestion, the P2 packet is successfully paired with the F1 packet, and the negotiation of the BFD parameters is out of order, which will cause a Down state of the BFD session.

Figure 7:
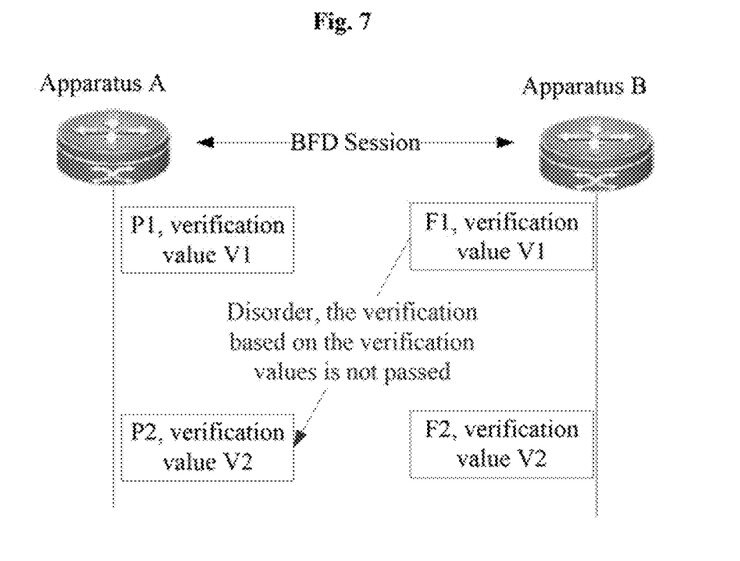
FIG. 7 is a schematic diagram of BFD packet negotiation according to an embodiment of the present disclosure.

FIG. 7 is a schematic diagram of BFD packet negotiation according to an embodiment of the present disclosure. As shown in FIG. 7, in the BFD asynchronous mode, the apparatus A (namely the first apparatus) that actively initiates parameter negotiation generates and saves a 4-byte verification value according to the Detect Mult, the Desired Min Tx Interval, and the Required Min Rx Interval of the apparatus A, and sends the 4-byte verification value to the apparatus B (namely the second apparatus) through the Require Min Echo Rx Interval field of the BDF packet. After receiving the BFD packet, the apparatus B copies the Require Min Echo Rx Interval field in the received BDF packet into the Require Min Echo Rx Interval field of an F packet to be replied by the apparatus B, and sends the F packet to the apparatus A. After receiving the F packet, the apparatus A checks the Require Min Echo Rx Interval field in the F packet. If the Require Min Echo Rx Interval field is equal to the verification value saved in the apparatus A, the P/F negotiation is considered successful; or else, the negotiation fails. The check of parameter negotiation disorder is performed by multiplexing the Require Min Echo Rx Interval field in the BFD packet.

A PF disorder check function needs to be globally enabled or disabled by a chip entry OamUpdateCt1.PFCheckEn, which specifically includes the following operations.

At S1, the apparatus A actively initiates parameter negotiation, generates a 4-byte verification value based on the Detect Mult, the Desired Min Tx Interval and the Required Min Rx Interval in the packet, and saves the verification value in the chip entry DsBFDMep.PFCheck; and the BFD TX logic of the chip writes the 4-byte verification value in the Require Min Echo Rx Interval field of the BFD packet.

At S2, after the apparatus B receives the P packet sent by the apparatus A and negotiates successfully, the apparatus B needs to reply with an F packet. If the apparatus A enables a BFD parameter disorder check function, the apparatus B copies the 4-byte Require Min Echo Rx Interval of the received P packet into the Require Min Echo Rx Interval field of the F packet to be replied by the apparatus B, and sends the F packet to the apparatus A.

At S3, after receiving the F packet, the apparatus A takes out the 4-byte Require Min Echo Rx Interval in the packet, and compares the 4-byte Require Min Echo Rx Interval with the value in the chip entry DsBFDMep.PFCheck of the apparatus A. If the 4-byte Require Min Echo Rx Interval and the value in the chip entry DsBFDMep.PFCheck of the apparatus A are equal, the parameter negotiation check is considered successful; or else, the check fails, and the negotiation fails, then the negotiation of the BFD parameters will not be performed, that is, the parameters before the negotiation are reserved to ensure that the first apparatus and the second apparatus will not go Down.

By adding the 4-type verification value in the BFD packet, the problem of disorder of the negotiation of BFD parameters is prevented, and the problem of session down caused by disorder of the negotiation of BFD parameters is solved.

Through the above description of the implementations, those skilled in the art may clearly know that the method according to the above embodiments may be implemented by means of software plus a necessary common hardware platform, certainly by means of hardware; but in many cases, the former is the better implementation. Based on this understanding, the technical solution of the embodiments of the present disclosure substantially or the part making a contribution to the conventional art can be embodied in the form of software product; the computer software product is stored in a storage medium (for example, a Read-Only Memory (ROM)/Random Access Memory (RAM), a magnetic disk, and a compact disc) and includes a number of instructions to make a computer apparatus (which can be a personal computer, a server or a network apparatus, etc.) perform all or part of the method in each embodiment of the present disclosure.

A BFD parameter negotiation apparatus is provided in the embodiments, which is configured to implement the above embodiments and preferred implementations. The embodiments which have been elaborated will not be repeated here. The term "module" used below can realize a combination of software and/or hardware with an intended function. Although the apparatus described in the following embodiment is realized through software better, the realization through hardware or a combination of software and hardware is possible and conceived.

Figure 8:
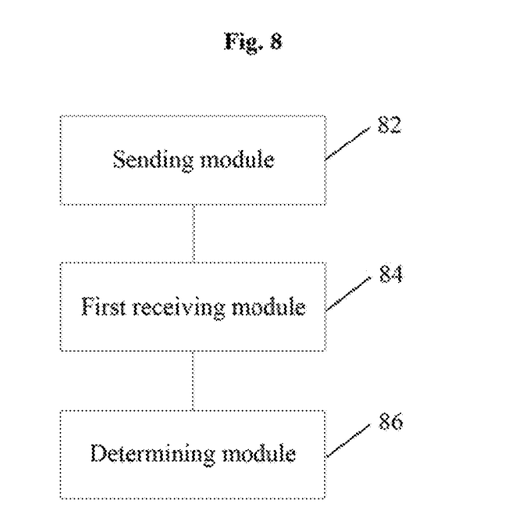
FIG. 8 is a first block diagram of a BFD parameter negotiation apparatus according to an embodiment of the present disclosure.

FIG. 8 is a first block diagram of a BFD parameter negotiation apparatus according to an embodiment of the present disclosure. As shown in FIG. 8, the BFD parameter negotiation apparatus is applied to a first apparatus and includes a sending module 82, a first receiving module 84, and a determining module 84.

The sending module 82 is configured to send a BFD negotiation packet to a second apparatus. The BFD negotiation packet carries a first verification value.

The first receiving module 84 is configured to receive a BFD negotiation response packet returned by the second apparatus. The BFD negotiation response packet carries a second verification value.

The determining module 86 is configured to check whether the first verification value and the second verification value match each other, and determine whether negotiation of BFD parameters is an erroneous negotiation according to a checking result.

In the embodiments of the present disclosure, the BFD negotiation packet is a BFD control packet with a P bit set to 1, referred to as a P packet, and the BFD negotiation response packet is a BFD control packet with an F bit set to 1, referred to as an F packet.

In some exemplary embodiments, the determining module 86 includes: a comparing unit, a first determining unit, and a second determining unit.

The comparing unit is configured to compare the second verification value with the first verification value.

The first determining unit is configured to determine, in a case where the comparison result is that the first verification value and the second verification value are equal, that the checking result is that the first verification value and the second verification value match each other, and determine that the negotiation of the BFD parameters is not an erroneous negotiation according to the checking result.

The second determining unit is configured to determine, in a case where the comparison result is that the first verification value and the second verification value are not equal, that the checking result is that the first verification value and the second verification value do not match each other, and determine that the negotiation of the BFD parameters is an erroneous negotiation according to the checking result.

In some exemplary embodiments, the apparatus may further include: a generating module, a saving module, and a writing module.

The generating module is configured to generate the first verification value according to negotiation content of the BFD parameters.

The saving module is configured to save the first verification value.

The writing module is configured to write the first verification value in a Required Min Echo Rx Interval field of the BFD control packet.

In some exemplary embodiments, the generating module is further configured to:
generate the first verification value according to at least one of the following negotiation content of the BFD parameters: the Detect Mult, the Desired Min Tx Interval, and the Required Min Rx Interval.

In some exemplary embodiments, the first verification value occupies 1 byte, 2 bytes, 3 bytes, or 4 bytes.

Figure 9:
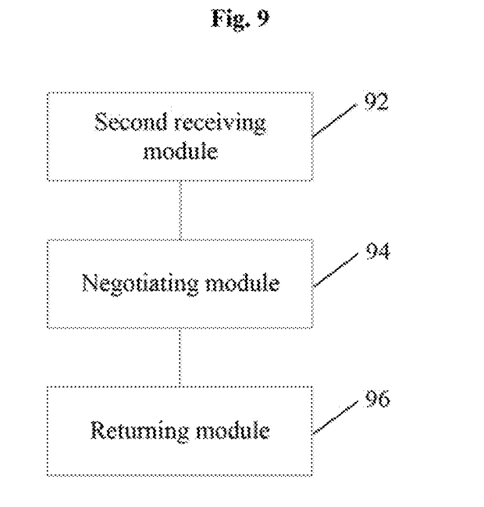
FIG. 9 is a second block diagram of a BFD parameter negotiation apparatus according to an embodiment of the present disclosure.

The embodiments of the present disclosure provide a BFD parameter negotiation apparatus, which is applied to a second apparatus. FIG. 9 is a second block diagram of a BFD parameter negotiation apparatus according to an embodiment of the present disclosure. As shown in FIG. 9, the BFD parameter negotiation apparatus includes: a second receiving module 92, a negotiating module 94, and a returning module 96.

The second receiving module 92 is configured to receive a BFD negotiation packet sent by a first apparatus. The BFD negotiation packet carries a first verification value.

The negotiating module 94 is configured to complete negotiation of BFD parameters according to the BFD negotiation packet.

The returning module 96 is configured to return a BFD negotiation response packet to the first apparatus. The BFD negotiation response packet carries a second verification value, and the BFD negotiation response packet is used for instructing the first apparatus to check whether the first verification value and the second verification value match each other and determine whether the negotiation of the BFD parameters is an erroneous negotiation according to a checking result.

In some exemplary embodiments, the apparatus further includes: a carrying module.

The carrying module is configured to carry the second verification value in the BFD negotiation response packet by writing the first verification value in a Required Min Echo Rx Interval field of the BFD control packet into the BFD negotiation response packet.

In some exemplary embodiments, the second verification value occupies 1 byte, 2 bytes, 3 bytes, or 4 bytes.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

According to yet another embodiment of the present disclosure, a BFD parameter negotiation chip is also provided, which includes:
a processor.

The processor is configured to:
send a BFD negotiation packet to a second apparatus, the BFD negotiation packet carrying a first verification value;
receive a BFD negotiation response packet returned by the second apparatus, the BFD negotiation response packet carrying a second verification value; and
check whether the first verification value and the second verification value match each other, and determine whether negotiation of BFD parameters is an erroneous negotiation according to a checking result.

According to yet another embodiment of the present disclosure, a BFD parameter negotiation chip is also provided, which includes:
a processor.

The processor is configured to:
receive a BFD negotiation packet sent by a first apparatus, the BFD negotiation packet carrying a first verification value;
complete negotiation of BFD parameters according to the BFD negotiation packet; and
return a BFD negotiation response packet to the first apparatus, the BFD negotiation response packet carrying a second verification value, and the BFD negotiation response packet being used for instructing the first apparatus to check whether the first verification value and the second verification value match each other and determine whether the negotiation of the BFD parameters is an erroneous negotiation according to a checking result.

An embodiment of the present disclosure also provides a storage medium. The storage medium stores a computer program. The computer program is configured to execute, at runtime, the operations in any of the above method embodiments.

In the present embodiment, the storage medium may be configured to store a computer program for executing the following operations.

At S11, a BFD negotiation packet is sent to a second apparatus. The BFD negotiation packet carries a first verification value.

At S12, a BFD negotiation response packet returned by the second apparatus is received. The BFD negotiation response packet carries a second verification value.

At S13, it is checked whether the first verification value and the second verification value match each other, and it is determined whether negotiation of BFD parameters is an erroneous negotiation according to a checking result.

In the present embodiment, the storage medium may further be configured to store a computer program for executing the following operations.

At S21, a BFD negotiation packet sent by a first apparatus is received. The BFD negotiation packet carries a first verification value.

At S22, negotiation of BFD parameters is completed according to the BFD negotiation packet.

At S23, a BFD negotiation response packet is returned to the first apparatus. The BFD negotiation response packet carries a second verification value, and the BFD negotiation response packet is used for instructing the first apparatus to check whether the first verification value and the second verification value match each other and determine whether the negotiation of the BFD parameters is an erroneous negotiation according to the checking result.

In the present embodiment, the storage media include, but not limited to, a USB flash disk, a ROM, a RAM, a mobile hard disk, a magnetic disk, a compact disc, and other media capable of storing the computer program.

An embodiment of the present disclosure also provides an electronic apparatus, which includes a memory and a processor. The memory stores a computer program. The processor is configured to run the computer program to execute the operations in any of the above method embodiments.

In some exemplary embodiments, the electronic apparatus may also include a transmission apparatus and an input/output apparatus. The transmission apparatus is connected with the processor, and the input/output apparatus is connected with the processor.

In the present embodiment, the processor may be configured to execute the following operations through the computer program.

At S11, a BFD negotiation packet is sent to a second apparatus. The BFD negotiation packet carries a first verification value.

At S12, a BFD negotiation response packet returned by the second apparatus is received. The BFD negotiation response packet carries a second verification value.

At S13, it is checked whether the first verification value and the second verification value match each other, and it is determined whether negotiation of BFD parameters is an erroneous negotiation according to the checking result.

In the present embodiment, the processor may further be configured to execute the following operations through the computer program.

At S21, a BFD negotiation packet sent by a first apparatus is received. The BFD negotiation packet carries a first verification value.

At S22, negotiation of BFD parameters is completed according to the BFD negotiation packet.

At S23, a BFD negotiation response packet is returned to the first apparatus. The BFD negotiation response packet carries a second verification value, and the BFD negotiation response packet is used for instructing the first apparatus to check whether the first verification value and the second verification value match each other and determine whether the negotiation of the BFD parameters is an erroneous negotiation according to the checking result.

In an exemplary embodiment, the specific examples in the present embodiment may refer to the examples described in the above embodiments and alternative embodiments.

It is apparent that those skilled in the art should appreciate that the above modules and operations in the embodiments of the present disclosure may be implemented by a general-purpose computing apparatus, and they may be centralized in a single computing apparatus or distributed on a network composed of multiple computing apparatuses; optionally, they may be implemented by a program code which is capable of being executed by the computing apparatus, so that they may be stored in a storage apparatus and executed by the computing apparatus; and in some situations, the presented or described operations may be executed in an order different from that described here; or they are made into integrated circuit modules, respectively; or multiple modules and operations of them are made into a single integrated circuit module to realize. Therefore, the embodiments of the present disclosure are not limited to any specific hardware and software combination.

The above is only the preferred embodiments of the present disclosure and not intended to limit the embodiments of the present disclosure; for those skilled in the art, the embodiments of the present disclosure may have various modifications and changes. Any modifications, equivalent replacements, improvements and the like within the principle of the present disclosure should fall within the protection scope of the embodiments of the present disclosure.

What is claimed is:

1. A Bidirectional Forwarding Detection (BFD) parameter negotiation method, comprising:
generating, by a first apparatus, a first verification value according to at least one of BFD parameters to be negotiated, wherein the BFD parameters to be negotiated comprise: Detect Mult, Desired Min Tx Interval, and Required Min Rx Interval;
writing, by the first apparatus, the first verification value into a Required Min Echo Rx Interval field of a BFD negotiation packet used for negotiating the BFD parameters to be negotiated, wherein the BFD negotiation packet further comprises a Detect Mult field, a Desired Min Tx Interval field, and a Required Min Rx Interval field respectively carrying the BFD parameters to be negotiated;
sending, by the first apparatus, the BFD negotiation packet to a second apparatus;
receiving, by the first apparatus, a BFD negotiation response packet returned by the second apparatus upon successful negotiation, wherein a Required Min Echo Rx Interval field of the BFD negotiation response packet carries a second verification value; and
checking, by the first apparatus, whether the first verification value and the second verification value match each other; determining, by the first apparatus in response to a case that the first verification value and the second verification value match each other, that the BFD negotiation response packet is a response to the BFD negotiation packet and negotiation of the BFD parameters is not an erroneous negotiation caused by BFD packet disorder; and determining, by the first apparatus in response to a case that the first verification value and the second verification value do not match each other, that the BFD negotiation response packet is not the response to the BFD negotiation packet and the negotiation of the BFD parameters is an erroneous negotiation caused by BFD packet disorder.

2. The method according to claim 1, wherein checking, by the first apparatus, whether the first verification value and the second verification value match each other comprises:
comparing, by the first apparatus, the second verification value with the first verification value;
in a case where the comparison result is that the first verification value and the second verification value are equal, determining, by the first apparatus, that the checking result is that the first verification value and the second verification value match each other;
in a case where the comparison result is that the first verification value and the second verification value are not equal, determining, by the first apparatus, that the checking result is that the first verification value and the second verification value do not match each other.

3. The method according to claim 1, wherein before sending, by the first apparatus, the BFD negotiation packet to the second apparatus, the method further comprises:
saving, by the first apparatus, the first verification value.

4. The method according to claim 1, wherein
the first verification value occupies 1 byte, 2 bytes, 3 bytes, or 4 bytes of the Required Min Echo Rx Interval field of the BFD negotiation packet.

5. A Bidirectional Forwarding Detection (BFD) parameter negotiation chip, comprising:
a processor;
wherein the processor is configured to execute the instructions to execute the following operations in the method according to claim 1:
generating a first verification value according to at least one of BFD parameters to be negotiated, wherein the BFD parameters to be negotiated comprise: Detect Mult, Desired Min Tx Interval, and Required Min Rx Interval;
writing the first verification value into a Required Min Echo Rx Interval field of a BFD negotiation packet used for negotiating the BFD parameters to be negotiated, wherein the BFD negotiation packet further comprises a Detect Mult field, a Desired Min Tx Interval field, and a Required Min Rx Interval field respectively carrying the BFD parameters to be negotiated;
sending the BFD negotiation packet to a second apparatus;
receiving a BFD negotiation response packet returned by the second apparatus upon successful negotiation, wherein a Required Min Echo Rx Interval field of the BFD negotiation response packet carries a second verification value; and
checking whether the first verification value and the second verification value match each other; determining, in response to a case that the first verification value and the second verification value match each other, that the BFD negotiation response packet is a response to the BFD negotiation packet and negotiation of the BFD parameters is not an erroneous negotiation caused by BFD packet disorder; and determining, in response to a case that the first verification value and the second verification value do not match each other, that the BFD negotiation response packet is not the response to the BFD negotiation packet and the negotiation of the BFD parameters is an erroneous negotiation caused by BFD packet disorder.

6. A non-transitory computer readable storage medium, storing a computer program, wherein the computer program is configured to execute, at runtime, the method according to claim 1.

7. The method according to claim 1, wherein checking, by the first apparatus, whether the first verification value and the second verification value match each other comprises:
comparing, by the first apparatus, the second verification value with the first verification value;
in a case where the comparison result is that the second verification value is formed by adding one or more pieces of content on the basis of the first verification value, determining, by the first apparatus, that the checking result is that the first verification value and the second verification value match each other;
in a case where the comparison result is that the second verification value is not formed by adding one or more pieces of content on the basis of the first verification value, determining, by the first apparatus, that the checking result is that the first verification value and the second verification value do not match each other.

8. The method according to claim 1, wherein the BFD negotiation packet is a BFD control packet with a P bit set to 1, and the BFD negotiation response packet is a BFD control packet with an F bit set to 1.

9. A Bidirectional Forwarding Detection (BFD) parameter negotiation method, comprising:
receiving, by a second apparatus, a BFD negotiation packet sent by a first apparatus and used for negotiating BFD parameters to be negotiated, wherein the BFD parameters to be negotiated comprise: Detect Mult, Desired Min Tx Interval, and Required Min Rx Interval; the BFD negotiation packet comprises a Required Min Echo Rx Interval field, a Detect Mult field, a Desired Min Tx Interval field, and a Required Min Rx Interval field, wherein the Required Min Echo Rx Interval field carries a first verification value generated by the first apparatus according to at least one of the BFD parameters to be negotiated, and the Detect Mult field, the Desired Min Tx Interval field, and the Required Min Rx Interval field respectively carry the BFD parameters to be negotiated;
completing, by the second apparatus, negotiation of the BFD parameters to be negotiated according to the BFD negotiation packet; and
upon successful negotiation, writing, by the second apparatus, the first verification value into a Required Min Echo Rx Interval field of a BFD negotiation response packet as a second verification value, and returning, by the second apparatus, the BFD negotiation response packet to the first apparatus, so as to instruct the first apparatus to check whether the first verification value and the second verification value match each other, determine, in response to a case that the first verification value and the second verification value match each other, that the BFD negotiation response packet is a response to the BFD negotiation packet and the negotiation of the BFD parameters is not an erroneous negotiation caused by BFD packet disorder, and determine, in response to a case that the first verification value and the second verification value do not match each other, that the BFD negotiation response packet is not the response to the BFD negotiation packet and the negotiation of the BFD parameters is an erroneous negotiation caused by BFD packet disorder.

10. The method according to claim 9, wherein
the second verification value occupies 1 byte, 2 bytes, 3 bytes, or 4 bytes of the Required Min Echo Rx Interval field of the BFD negotiation response packet.

11. A Bidirectional Forwarding Detection (BFD) parameter negotiation apparatus applied to a second apparatus, comprising a memory storing instructions and a processor in communication with the memory, wherein the processor is configured to execute the instructions to execute the method according to claim 9.

12. A Bidirectional Forwarding Detection (BFD) parameter negotiation chip, comprising:
a processor;
wherein the processor is configured to execute the instructions to execute the following operations in the method according to claim 6:
receiving a BFD negotiation packet sent by a first apparatus and used for negotiating BFD parameters to be negotiated, wherein the BFD parameters to be negotiated comprise: Detect Mult, Desired Min Tx Interval, and Required Min Rx Interval; the BFD negotiation packet comprises a Required Min Echo Rx Interval field, a Detect Mult field, a Desired Min Tx Interval field, and a Required Min Rx Interval field, wherein the Required Min Echo Rx Interval field carries a first verification value generated by the first apparatus according to at least one of the BFD parameters to be negotiated, and the Detect Mult field, the Desired Min Tx Interval field, and the Required Min Rx Interval field respectively carry the BFD parameters to be negotiated;
completing negotiation of the BFD parameters to be negotiated according to the BFD negotiation packet; and
upon successful negotiation, writing the first verification value into a Required Min Echo Rx Interval field of a BFD negotiation response packet as a second verification value, and returning the BFD negotiation response packet to the first apparatus, so as to instruct the first apparatus to check whether the first verification value and the second verification value match each other, determine, in response to a case that the first verification value and the second verification value match each other, that the BFD negotiation response packet is a response to the BFD negotiation packet and the negotiation of the BFD parameters is not an erroneous negotiation caused by BFD packet disorder, and determine, in response to a case that the first verification value and the second verification value do not match each other, that the BFD negotiation response packet is not the response to the BFD negotiation packet and the negotiation of the BFD parameters is an erroneous negotiation caused by BFD packet disorder.

13. A non-transitory computer readable storage medium, storing a computer program, wherein the computer program is configured to execute, at runtime, the method according to claim 9.

14. The method according to claim 9, wherein the BFD negotiation packet is a BFD control packet with a P bit set to 1, and the BFD negotiation response packet is a BFD control packet with an F bit set to 1.

15. A Bidirectional Forwarding Detection (BFD) parameter negotiation apparatus applied to a first apparatus, comprising a memory storing instructions and a processor in communication with the memory, wherein the processor is configured to execute the instructions to:
generate a first verification value according to at least one of BFD parameters to be negotiated, wherein the BFD parameters to be negotiated comprise: Detect Mult, Desired Min Tx Interval, and Required Min Rx Interval;
write the first verification value into a Required Min Echo Rx Interval field of a BFD negotiation packet used for negotiating the BFD parameters to be negotiated, wherein the BFD negotiation packet further comprises a Detect Mult field, a Desired Min Tx Interval field, and a Required Min Rx Interval field respectively carrying the BFD parameters to be negotiated;
send the BFD negotiation packet to a second apparatus;
receive a BFD negotiation response packet returned by the second apparatus upon successful negotiation, wherein a Required Min Echo Rx Interval field of the BFD negotiation response packet carries a second verification value; and
check whether the first verification value and the second verification value match each other; determine, in response to a case that the first verification value and the second verification value match each other, that the BFD negotiation response packet is a response to the BFD negotiation packet and negotiation of BFD parameters is not an erroneous negotiation caused by BFD packet disorder; and determine, in response to a case that the first verification value and the second verification value do not match each other, that the BFD negotiation response packet is not the response to the BFD negotiation packet and the negotiation of the BFD parameters is an erroneous negotiation caused by BFD packet disorder.

16. The apparatus according to claim 15, wherein the processor, when configured to execute the instructions to check whether the first verification value and the second verification value match each other, is configured to:
compare the second verification value with the first verification value;
in a case where the comparison result is that the first verification value and the second verification value are equal, determine that the checking result is that the first verification value and the second verification value match each other;
in a case where the comparison result is that the first verification value and the second verification value are not equal, determine that the checking result is that the first verification value and the second verification value do not match each other.

17. The apparatus according to claim 15, wherein the processor, when configured to execute the instructions to check whether the first verification value and the second verification value match each other, is configured to:
compare the second verification value with the first verification value;
in a case where the comparison result is that the second verification value is formed by adding one or more pieces of content on the basis of the first verification value, determine that the checking result is that the first verification value and the second verification value match each other;
in a case where the comparison result is that the second verification value is not formed by adding one or more pieces of content on the basis of the first verification value, determine that the checking result is that the first verification value and the second verification value do not match each other.

18. The apparatus according to claim 15, wherein the processor is further configured to execute the instructions to:
  save the first verification value.

19. The apparatus according to claim 15, wherein the BFD negotiation packet is a BFD control packet with a P bit set to 1, and the BFD negotiation response packet is a BFD control packet with an F bit set to 1.

* * * * *